(12) United States Patent
Daily

(10) Patent No.: US 7,336,198 B2
(45) Date of Patent: Feb. 26, 2008

(54) MAGNETOSTATIC COMMUNICATION

(75) Inventor: William D. Daily, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 313 days.

(21) Appl. No.: 11/203,559

(22) Filed: Aug. 12, 2005

(65) Prior Publication Data

US 2007/0064471 A1   Mar. 22, 2007

(51) Int. Cl.
*H04B 13/02* (2006.01)
(52) U.S. Cl. .................................... 340/850; 340/855.7
(58) Field of Classification Search ................ 340/850, 340/855.7; 367/131
See application file for complete search history.

(56) References Cited

U.S. PATENT DOCUMENTS

| 4,203,109 A | 5/1980 | Ballard et al. |
| 4,716,390 A | 12/1987 | Elliott et al. |
| 5,038,406 A | 8/1991 | Titterton et al. |
| 5,404,144 A | 4/1995 | Vlannes |
| 6,628,800 B2 * | 9/2003 | Tajima ........................ 381/417 |
| 6,639,402 B2 * | 10/2003 | Grimes et al. .............. 324/239 |

FOREIGN PATENT DOCUMENTS

| GB | 2 274 374 A | 7/1994 |
| WO | WO 03/094385 A2 | 11/2003 |

\* cited by examiner

*Primary Examiner*—Albert K. Wong
(74) *Attorney, Agent, or Firm*—Eddie E. Scott; John H. Lee

(57) ABSTRACT

A system for providing communication of information by modulating a magnetostatic field with a magnetostatic transmitter that modulates said magnetostatic field to contain the information and detecting the information in the modulated field at a distance with a magnetostatic detector that detects the modulated magnetic field containing the information.

12 Claims, 3 Drawing Sheets

MAGNETOSTATIC COMMUNICATION

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to communication and more particularly to magnetostatic communication.

2. State of Technology

U.S. Pat. No. 5,038,460 for secure two-way submarine communication system issued Aug. 6, 1991 to Paul J. Titterton et al provides the following state of technology information, "From the time that the first submarine slipped beneath the ocean surface, there has been a need for two-way (duplex) communications with them. Since that first submarine, communication technologies have substantially improved basic submarine communications; however, for various reasons no one system has been completely satisfactory. Current methods of communication generally require the submarine either to surface or to send a probe to the surface, neither of which is very desirable. Such action potentially exposes the submarine to its adversary, it limits the submarine's overall maneuverability when in use, and it detracts from the submarine's mission. Because a submarine is most vulnerable when it attempts to communicate, the present solution when far from home is basically no communication at all."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for communicating voice or any other low bandwidth information by modulating a magnetostatic field and detecting the field at a distance. The present invention provides a system for providing communication of information comprising modulating a magnetostatic field with a magnetostatic transmitter that modulates said magnetostatic field to contain the information, and detecting the information in the modulated field at a distance with a magnetostatic detector that detects the modulated magnetic field containing the information. In one embodiment, the modulating a magnetostatic field with a magnetostatic transmitter is operated at a modulation frequency low enough so that displacement currents are negligible.

In one embodiment, the present invention provides apparatus that enables communication of information by modulating a magnetostatic field to transmit the information and detecting the information in the modulated field at a distance, comprising an input unit for inputting the information; a transmitter that modulates the magnetostatic field to contain the information, said transmitter operatively connected to said input unit; a magnetostatic detector that detects the modulated magnetic field containing the information at a distance; and an output unit for outputting the information, said output unit operatively connected to said detector.

The invention can be used for audio or data communications where radiating electromagnetic waves or wires are not possible or desirable. Examples include submarine to submarine, submarine to torpedo, and submarine to surface ship communication. The invention can also be used for audio or data communications for mine rescue operations, intra-tunnel communications, tunnel to surface communications, building to outside communications, communication through steel walls of cargo containers, and other communications.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
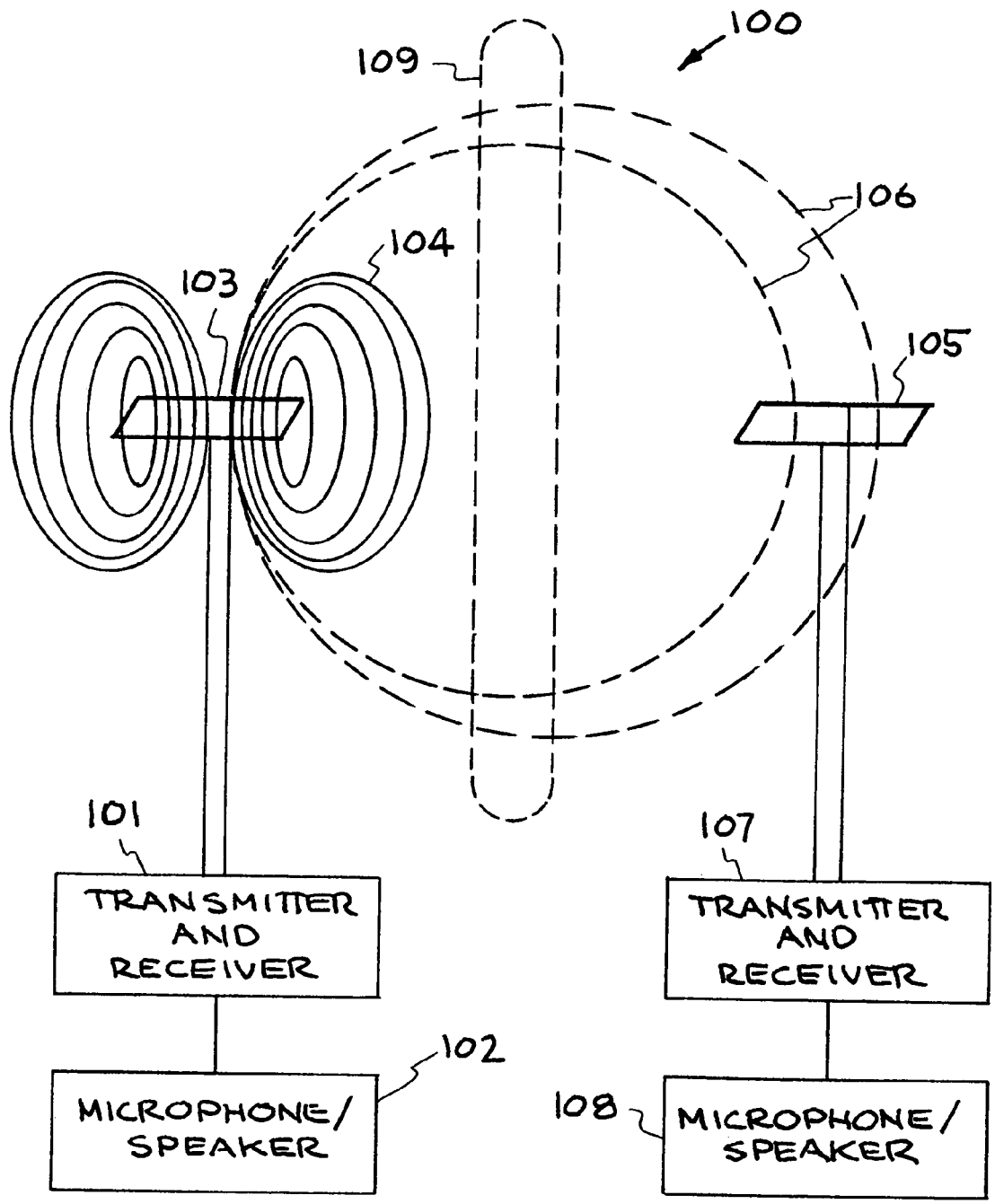
FIG. 1 illustrates an embodiment of a system constructed in accordance with the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, an embodiment of a system constructed in accordance with the present invention is illustrated. The system is designated generally by the reference numeral 100. The system 100 provides communication by modulating a magnetostatic field and detecting the field at a distance. The system 100 allows voice or any other properly encoded, low bandwidth information to be transmitted.

The system 100 includes a magnetic field 104; for example, a magnetic dipole as established using a multi-turn coil of wire 103. The amplitude of the field 104 is modulated directly by voice or other coded information. The modulation frequency is low enough so that the displacement currents are very small and there is no wave propagation. Under most circumstances this is below 2 kHz. The receiver 107 comprises another coil 105 or a magnetometer. The receiver 107 detects the modulated magnetic field 104, amplifies the signal and supplies a voltage that can directly drive a speaker or other output device. There is no demodulation of the detected signal because there is no carrier modulation.

The system 100 includes a number of structural elements. A microphone/speaker 102 and a transmitter/receiver 101 allow information to be transmitted through a multiturn coil of wire 103. The multiturn coil of wire 103 provides a magnetic field dipole 104. This produces a remote dipole magnetic field 106 in the medium 109 through which the signal is transmitted. A detector loop 105, receiver/transmitter 107, and a speaker/microphone 108 detect the modulated magnetic field 104.

The source magnetic field 104/106 is modulated with the information to be transmitted, which in turn modulates the current in the detector loop 105. The frequency is low enough that a magnetostatic [no displacement currents so there is no wave propagation] dipole field is established by the transmitter or source. The receiver 107 detects the modulated field at the receiver dipole 105. Both multiturn coils 103 and 105 have a receiving as well as transmitting capability allowing for two-way communication. The separation of the two dipoles is limited because the field strength for a magnetic dipole falls of as the cube of the inverse distance from the dipole. The magnitude of the magnetic field B resulting from a current flowing through a wire is $$B = \mu_0/2\pi\mu/r^3$$

where $\mu_0$ is the magnetic permeability of free space, $\mu$ is the magnetic dipole moment, and r is the distance from the current. It is assumed here that the distance is much greater than the diameter of the loop—the far-field approximation. The magnetic moment is $\mu=NiA$ where i is the current, A is the area of the planer conductor, and N is the number of turns in the loop.

The system 100 can be used for audio or data communications where radiating EM waves or wires are not possible or desirable. Examples include, submarine to submarine, submarine to torpedo, and submarine to surface ship communications. The system 100 can also be used for mine rescue communications, intra-tunnel communications, tunnel to surface communications, building to outside communications, communication through steel walls of cargo containers, and other communications.

Figure 2:
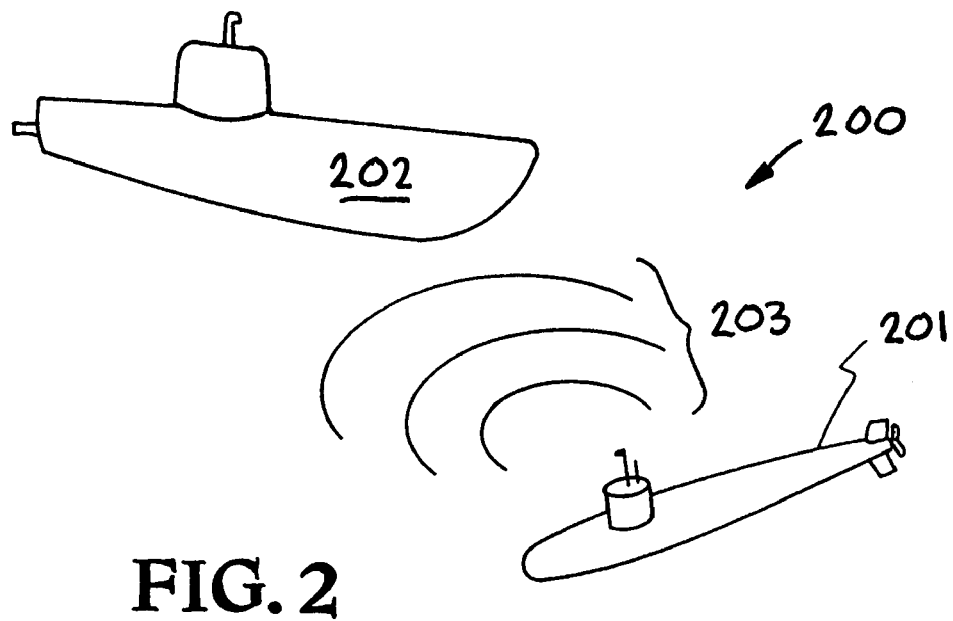
FIG. 2 illustrates an example application of a system constructed in accordance with the present invention.

Referring now to FIG. 2, an embodiment of a system constructed in accordance with the present invention is illustrated. The system is designated generally by the reference numeral 200. The system 200 provides communication by modulating a magnetostatic field and detecting the field at a distance. The system 200 allows voice or other low bandwidth information to be transmitted. The system 200 may be used for audio or data communications where radiating EM waves or wires are not possible or desirable.

As illustrated in FIG. 2, the system 200 provides submarine to submarine communication. A submarine 201 is shown sending voice and other low bandwidth information to submarine 202. The system 200 provides communication by modulating a magnetostatic field 203 and detecting the field at a distance. The modulation frequency is below 2 kHz, or low enough so that the displacement currents are very small and there is no wave propagation. The solution to Maxwell's field equations leads to a wave equation whose solutions for plane waves is $$E = E_0 e^{j\omega t - \gamma x}$$

$$H = H_0 e^{j\omega t - \gamma x}$$

for the electric and magnetic fields. Here, $\omega$ is the frequency and $\gamma$ is the complex propagation factor $$\gamma = j\omega\sqrt{\epsilon^*\mu^*}$$

and $\epsilon\mu$ is the product of electric permittivity and magnetic permeability. When $\omega$ becomes small then the propagation factor becomes small and the time dependence is no longer important. This is the magnetostatic approximation when $E = E_0$ and $H = H_0$.

The source magnetic field is modulated with the information to be transmitted from submarine 201. A receiver in submarine 202 detects the modulated field. Both submarines 201 and 202 have magnetic dipoles with receiving as well as transmitting capability allowing for two-way communication.

Figure 3:
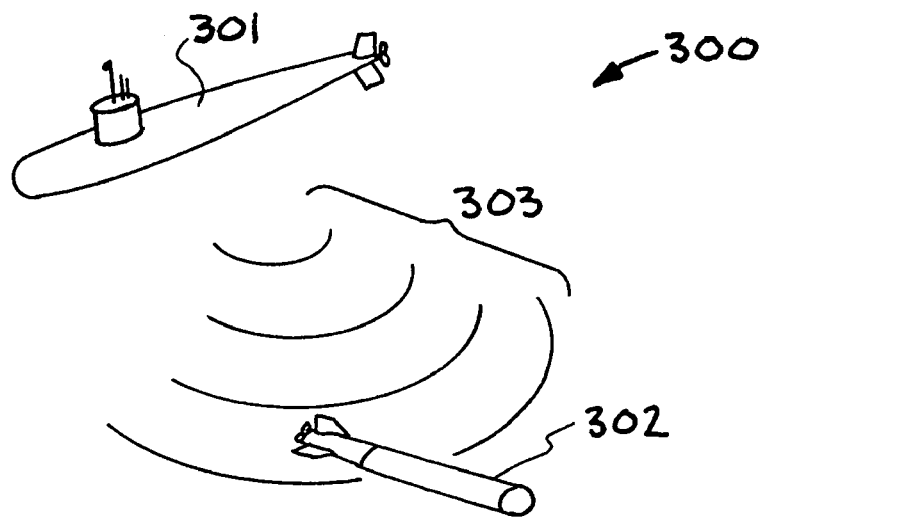
FIG. 3 illustrates yet another example application of a system constructed in accordance with the present invention.

Referring now to FIG. 3, another embodiment of a system constructed in accordance with the present invention is illustrated. This embodiment is designated generally by the reference numeral 300. The system 300 provides communication by modulating a magnetostatic field and detecting the field at a distance. The system 300 allows voice or other low bandwidth information to be transmitted. The system 300 may be used for audio or data communications where radiating EM waves or wires are not possible or desirable.

As illustrated in FIG. 3, the system 300 provides communication between a submarine 301 and a torpedo 302. The submarine 301 is shown sending low bandwidth information to torpedo 302. The system 300 provides communication by modulating a magnetostatic field 303 and detecting the field at a distance. The modulation frequency is below 2 kHz or low enough so that the displacement currents are very small and there is no wave propagation. The source magnetic field is modulated with the information to be transmitted from submarine 301. A receiver in torpedo 302 detects the modulated field.

Figure 4:
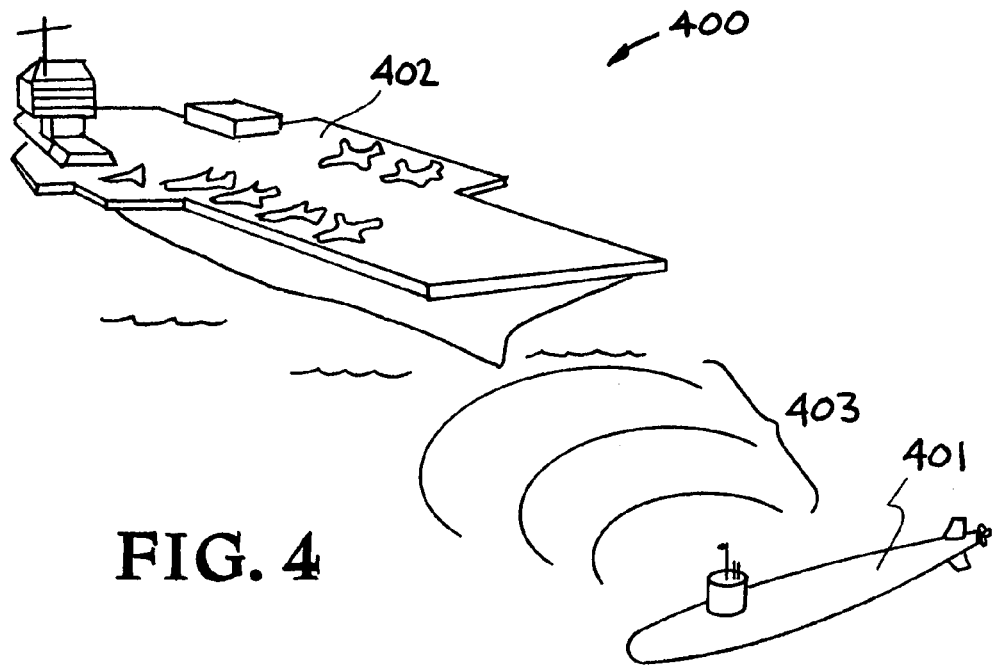
FIG. 4 illustrates yet another example application of a system constructed in accordance with the present invention.

Referring now to FIG. 4, an embodiment of a system constructed in accordance with the present invention is illustrated. The system is designated generally by the reference numeral 400. The system 400 provides communication by modulating a magnetostatic field and detecting the field at a distance. The system 400 allows voice or other low bandwidth information to be transmitted. The system 400 may be used for audio or data communications where radiating EM waves or wires are not possible or desirable.

As illustrated in FIG. 4, the system 400 provides submarine to surface ship communication. A submarine 401 is shown sending voice and other low bandwidth information to the surface ship 402. The system 400 provides communication by modulating a magnetostatic field 403 and detecting the field at a distance. The modulation frequency is below 2 kHz or low enough so that the displacement currents are very small and there is no wave propagation. The source magnetic field is modulated with the information to be transmitted from submarine 401. A receiver in the surface ship 402 detects the modulated field. Both the submarine 401 and the surface ship 402 have magnetic dipoles with receiving as well as transmitting capability allowing for two-way communication.

Figure 5:
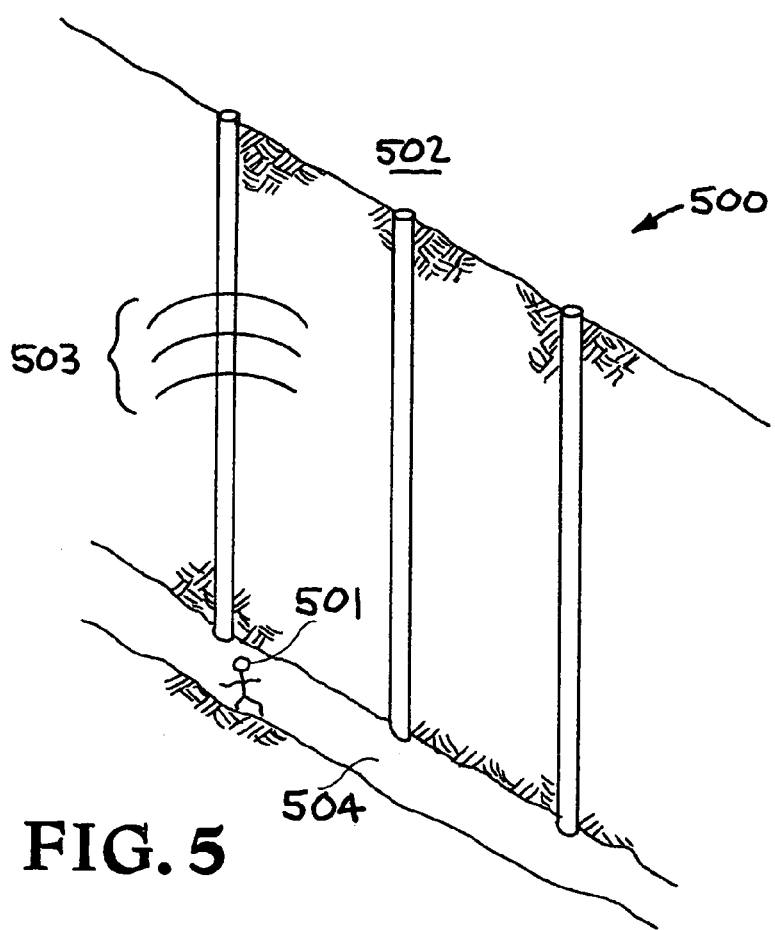
FIG. 5 illustrates yet another example application of a system constructed in accordance with the present invention.

Referring now to FIG. 5, an embodiment of a system constructed in accordance with the present invention is illustrated. The system is designated generally by the reference numeral 500. The system 500 provides communication by modulating a magnetostatic field and detecting the field at a distance. The system 500 allows voice or other low bandwidth information to be transmitted. The system 500 may be used for audio or data communications where radiating EM waves or wires are not possible or desirable.

As illustrated in FIG. 5, the system 500 provides communication for mine rescue operations. An operator 501 is shown sending voice and other low bandwidth information to the surface 502 of a mine 504. The system 500 provides communication by modulating a magnetostatic field 503 and detecting the field at a distance. The modulation frequency is below 2 kHz or low enough so that the displacement currents are very small and there is no wave propagation. The source magnetic field is modulated with the information to be transmitted from subsurface location 501. A receiver at the surface 502 of the mine 504 detects the modulated field. Both the operator 501 and an operator at the surface 502 of the mine 504 have magnetic dipoles with receiving as well as transmitting capability allowing for two-way communication.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. An apparatus that provides communication of information, comprising:
   a first unit for inputting the information;
   a transmitter that produces and modulates a magnetostatic field to contain the information, said transmitter operatively connected to said first unit;
   a detector that detects the modulated magnetic field containing the information at a distance; and
   a second unit for outputting the information, said second unit operatively connected to said detector.

2. The apparatus that provides communication of information of claim 1 wherein said transmitter that produces and modulates a magnetostatic field to contain the information is a transmitter that operates at a modulation frequency below about 2 kHz or low enough that no wave is propagated.

3. The apparatus that provides communication of information of claim 1 wherein said transmitter that produces and modulates a magnetostatic field to contain the information is a multi-turn coil of wire that provides a magnetic field dipole.

4. The apparatus that provides communication of information of claim 1 wherein said detector that detects the modulated magnetic field containing the information at a distance is a detector loop.

5. The apparatus that provides communication of information of claim 1 wherein said first unit is a microphone.

6. The apparatus that provides communication of information of claim 1 wherein said second unit for outputting the information is a speaker.

7. An apparatus that provides communication of information by modulating a magnetostatic field to transmit the information and detecting the information in the modulated field at a distance, comprising:
   an input unit for inputting the information;
   a magnetostatic transmitter that modulates the magnetostatic field to contain the information, said transmitter operatively connected to said input unit;
   a magnetostatic detector that detects the modulated magnetic field containing the information at a distance; and
   an output unit for outputting the information, said output unit operatively connected to said detector.

8. The apparatus that provides communication of information of claim 7 wherein said magnetostatic transmitter that modulates the magnetostatic field to contain the information is a transmitter that operates at a modulation frequency low enough so that displacement currents are not important.

9. The apparatus that provides communication of information of claim 7 wherein said magnetostatic transmitter that modulates the magnetostatic field to contain the information is a loop or a multiturn coil of wire that provides a magnetic field dipole.

10. The apparatus that provides communication of information of claim 7 wherein said magnetostatic detector that detects the modulated magnetic field containing the information at a distance is a detector loop or multiturn loop of wire.

11. A method of providing communication of information, comprising the steps of:
   modulating a magnetostatic field with a magnetostatic transmitter to encode information within the magnetostatic field;
   detecting the information in the modulated field at a distance with a magnetostatic detector that detects the modulated magnetostatic field containing the information; and
   recovering the information from the modulated field.

12. The method of providing communication of information of claim 11 wherein said step of modulating a magnetostatic field with a magnetostatic transmitter is operated at a modulation frequency below 2 kHz or low enough that displacement currents are negligible.

* * * * *